Oct. 20, 1970    G. F. LEWIS ET AL    3,535,001
BELT LOCKING DEVICE WITH ELECTRICAL ENERGIZING MEANS
Original Filed April 21, 1967    2 Sheets-Sheet 1
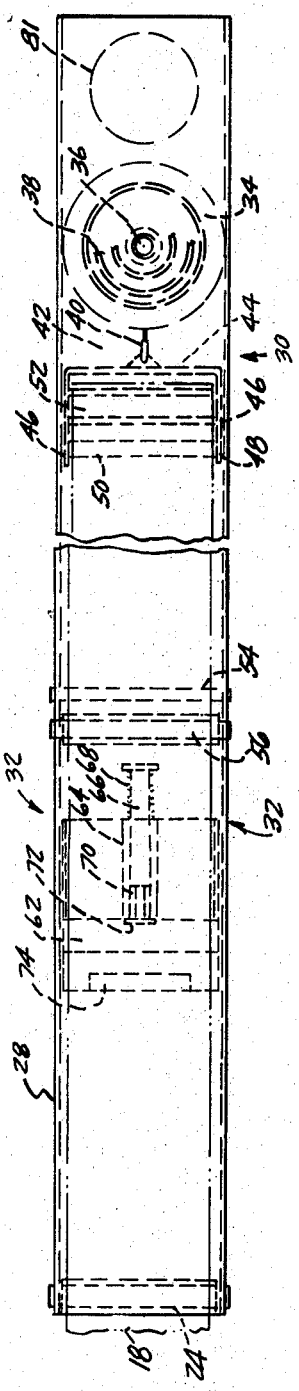
FIG. 3
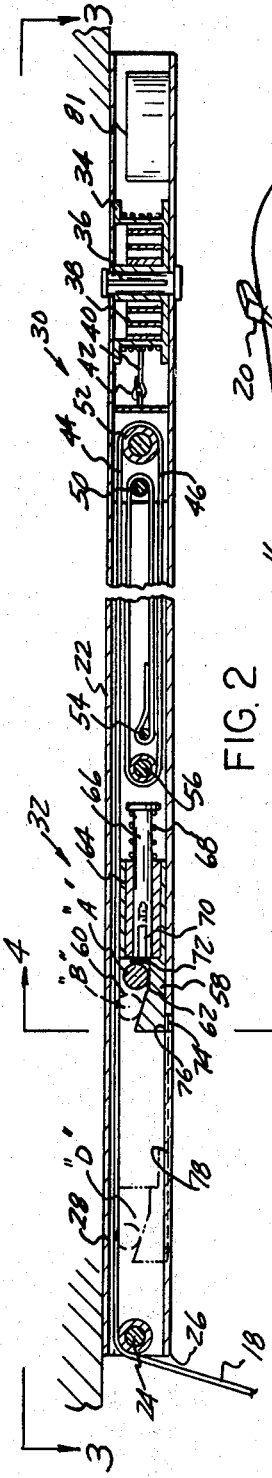
FIG. 2
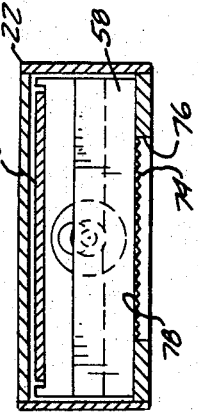
FIG. 1
FIG. 4
INVENTORS
GERALD F. LEWIS
RONALD J. PALMIERI
BY Hauke, Krass, & Jeffords
ATTORNEYS Oct. 20, 1970   G. F. LEWIS ET AL   3,535,001
BELT LOCKING DEVICE WITH ELECTRICAL ENERGIZING MEANS
Original Filed April 21, 1967   2 Sheets-Sheet 2

INVENTORS
GERALD F. LEWIS
RONALD J. PALMIERI
BY
ATTORNEYS

United States Patent Office 3,535,001
Patented Oct. 20, 1970

3,535,001
BELT LOCKING DEVICE WITH ELECTRICAL ENERGIZING MEANS
Gerald F. Lewis, Berkley, and Ronald J. Palmieri, Detroit, Mich., assignors to Jim Robbins Seat Belt Co., Royal Oak, Mich.
Continuation of application Ser. No. 632,663, Apr. 21, 1967. This application Mar. 6, 1969, Ser. No. 805,051
Int. Cl. A62b 35/00; B60r 21/10
U.S. Cl. 297—388                  13 Claims

ABSTRACT OF THE DISCLOSURE

A belt restraining system is disclosed for restricting the extension of a vehicle seat belt from a stored position when the vehicle experiences a sudden change in momennum or a change in its normal orientation. A belt clamping device mounted on a movable carriage is actuated by a solenoid electrically connected to a mercury switch. Displacement of the mercury from a position of equilibrium to a circuit closing position connects the solenoid to a source of electrical energy and causes the clamping device to clamp the belt to the carriage. The carriage has a series of scraper teeth guided for movement along an interference path with a scraper member fixed to the vehicle so that the carriage provides an energy-absorbing extension of the belt.

RELATION TO OTHER APPLICATIONS

This application is a continuation of application Ser. No. 632,663, filed Apr. 21, 1967, and now abandoned.

BACKGROUND OF THE INVENTION

Field of the invention

This invention relates to a locking device for a vehicle safety seat belt extendible from a stored position and forming a part of an occupant restraint and more specifically a belt clamping device which is electrically actuated by the displacement of an electrically conductive non-wetting fluid from a position of equilibrium to a current closing position in reaction to a sudden change in the acceleration of the vehicle.

Description of the prior art

Seat belt arrangements are widely employed in modern vehicles to produce a restraining force on an occupant of the seat belt in the event of a sudden change in the vehicle's acceleration. Conventional seat belt restraint systems have been received with a great reluctance on the part of the public primarily because of the restrictions that they place on the normal movements of the occupant. Thus, where the belt sections are extended from their anchor point to encircle the occupant, he is restrained from leaning forward from his seated position without either disengaging the belt sections or adjusting them to provide sufficient slack. In either of these situations, the belt arrangement is inoperative as a restraining means in an emergency situation.

To overcome the above drawback, a number of retracting devices have been disclosed in the prior art which bias the belt toward a stored wound-up position but respond to a nominal pull-out force by permitting the belt to extend from the stored position. Typical retractors of the prior art employ some form of automatic locking feature which is operative in the event of an emergency situation such as a collision to prevent extension of the belt from its stored position. Conventionally, such retractors are of the rotary rewind type with a spring-biased reel for winding the unextended portion of the belt into a roll. A pull-out force acting to extend the belt at an abnormal feed-out rate causes a movable locking member forming a part of the wind-up reel to be displaced from a normal release position to a reel locking position. The displacement of the locking member is usually produced by an increase in centrifugal force or a change in the inertia of the locking member as the reel rotates at a predetermined rate.

Such devices of the prior art have received a relatively poor commercial acceptance because of a number of inherent drawbacks. One of these drawbacks is the difficulty in providing a locking arrangement that reacts within a given reaction time throughout the full extended operating length of the belt in response to a predetermined tensile force. The reason is that such devices are dependent on the rotation of the wind-up reel. This rotation is not constant throughout the full extension of the belt for a given feed-out rate but varies as a function of the diameter of the closed portion of the belt.

Another problem of conventional automatic locking retractors is that they are nomally responsive to a sudden deceleration of the vehicle but are not responsive to a sudden lateral change in momentum or a sudden acceleration of the vehicle.

Another drawback of conventional locking retractors is that they are normally dependent on an excessive belt feed-out rate or an excessive wind-up rotation. Because of this limitation they do not react within an acceptable time span in a situation where the vehicle is abnormally oriented such as during a roll-over or the like.

Still another drawback in conventional automatic locking retractors are the massive restraining forces imposed on the occupant when the belt is locked during a collision. These forces are transmitted by the relatively unyielding belt to the torso of the occupant and produce serious internal injuries.

It is the broad purpose of the present invention to provide a belt locking mechanism for an extendible vehicle seat belt which obviates the aforementioned drawbacks of conventional automatic-locking retractors.

SUMMARY

The preferred embodiment of the present invention, which will be subsequently described in greater detail, is described with reference to a belt section forming part of an upper torso restraint for a seated occupant and includes a belt retracting device mounted to the roof of the vehicle. The retracting device applies a force on the belt tending to bias it towards a stored position. A nominal pull-out force on the belt by the occupant extends the belt to readily accommodate the physical dimensions of the occupant and his movements.

A preferred locking device is arranged between the retracting device and the occupant and includes a rectangular tube for guiding the belt toward its operating position from the retracting device. A carriage is mounted within the tube and has an inclined surface converging toward the tube wall in the direction of the movement of the belt toward its extended position. A roller clamping is normally arranged at the base of the inclined surface and spaced from the belt. A solenoid having a spring-loaded actuator is mounted on the carriage with the actuator in abutment with the roller member. When the solenoid is energized the actuator pushes the roller member up the inclined surface to a position wherein it wedges the belt between the tube wall and the inclined surface of the carriage.

If a predetermined tensile force is applied to the belt with the locking device in the belt locking condition, the carriage and the clamped section of the belt move as a unit to provide a controlled energy-absorbing extension. This controlled extension is provided by a series of scraper teeth carried by the carriage which scrape a series of grooves in the tube wall to retard the movement of the carriage and the belt.

A mercury switch mounted to the vehicle is arranged to provide a circuit-closing connection between the vehicle battery and the solenoid. The switch comprises a container having a chamber partially filled with mercury which is normally disposed in a position of equilibrium in the dished bottom metal portion of the chamber. The bottom dished portion is connected to the battery. The mercury is displaceable from this position of equilibrium to a circuit closing position when a sudden force acting in any direction is applied to the vehicle or if the vehicle is disoriented from its normal position of orientation. The displaced mercury bridges the edge of the bottom portion and a metal, cylindrical side section of the chamber electrically connected to the solenoid.

It is therefore an object of the present invention to provide an automatic locking device for an extendable vehicle seat belt which operates independently of belt movement.

It is another object of the present invention to provide an automatic locking device for a vehicle seat belt arrangement having a retractor device biasing the belt toward a stored position with the locking device operable independently of the retracting device.

It is a still further object of the present invention to provide a locking device for a normally extendable belt which is responsive to a disorientation of the vehicle from a normal position of orientation to clamp the belt to a relatively fixed vehicle component.

It is another object of the present invention to provide an electrically energized locking device for an extendable vehicle seat belt which may be employed as a backup to a mechanical inertia actuated locking device and comprising a belt locking unit movable between a belt-clamping condition and a belt-release condition, a solenoid arranged to move the locking unit to the belt-clamping condition when connected to a source of electrical power, and a mercury switch connecting the source of electrical power and the solenoid, the mercury switch having a quantity of mercury normally disposed in a position of equilibrium corresponding to an open switch condition and the mercury being displaceable to a closed-switch position when the vehicle experiences an abnormal condition.

Still another object of the present invention is to provide electrically actuated locking means for an extendable vehicle seat belt which provides a controlled, energy-absorbing extension of the belt as the belt restrains the occupant from a sudden displacement from his seat in reaction to sudden and abnormal forces acting on the vehicle.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views in which:

FIG. 1 is a perspective view of a vehicle seat belt arrangement for providing a restraint on a seated occupant with an overhead mounted upper torso belt section;

FIG. 2 is an elevational sectional view of a preferred locking and retracting device illustrating the preferred embodiment of the present invention and mounted in the ceiling of the vehicle of FIG. 1 for controlling the overhead mounted belt section;

FIG. 3 is a sectional view of the locking and retracting device illustrated in FIG. 2;

FIG. 4 is a view taken along the line 4—4 of FIG. 2 and illustrating the scraper teeth arrangement;

DESCRIPTION OF THE PREFERRED EMBODIMENTS

Figure 5:
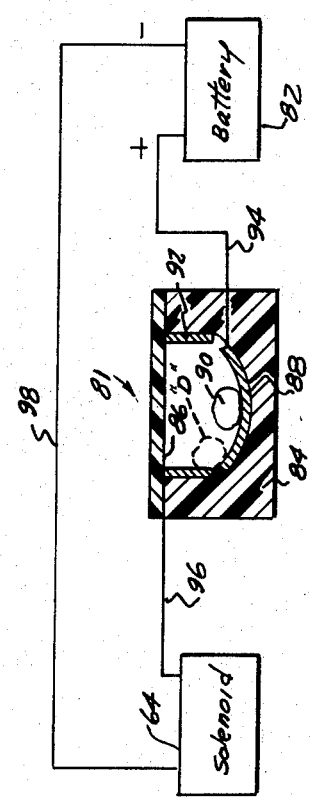
FIG. 5 is a preferred electrical circuit for energizing the locking device of FIG. 2.

Now referring to the drawings, FIG. 1 illustrates a vehicle seat belt assembly 10 having sections arranged to provide both pelvic and upper torso restraints to an occupant 12 of a seat 14. The seat 14 is mounted to the floor of the vehicle 16. The seat belt assembly 10 includes an upper belt section 18 extending through a bezel 20 attached to the ceiling of the vehicle 16.

Now referring to FIG. 2, an elongated hollow guide tube 22 is attached to the ceiling of the vehicle 16 and supports a roller member 24 adjacent its forward open end 26. The guide roller receives the belt 18 and guides it for movement adjacent the upper wall 28 of the tube. The belt 18 extends rearwardly from the guide roller 24 to a retracting assembly 30. A locking device generally indicated at 32 is disposed within the guide tube between the guide roller 24 and the retracting device 30.

It is to be understood that the locking device 32 and the retracting device 30 operate independently of one another. Thus, the locking device 32 can be used in combination with any suitable retracting device arranged to bias the belt 18 toward a stored position from an extended operating position. The retracting device 30 has particular advantages with respect to an overhead mounting in that it stores the belt 18 in a relatively narrow space in a series of linear lengths.

The preferred retracting device comprises a wind-up drum 34 supported for rotation about a vertical pin 36 attached to the upper and lower walls of the guide tube 22. A spiral spring member 38 is connected to the pin 36 and the drum 34 and is normally pretensioned. Preferably, a nylon covered cable 40 is wound around the drum 34 and anchored thereto. The free end 42 of the cable is attached to a generally U-shaped yoke 44.

The yoke 44 has a pair of forwardly extending legs 46 and 46 supporting a pair of rollers 50 and 52. The yoke 44 is slidable within the tube 24 toward and away from the wind-up drum 34. Each of the rollers 50 and 52 has a length accommodating the width of the belt 18 and is supported for rotation about an axis transverse to the movement of the belt 18. As can best be seen in FIG. 2, the rearward roller 52 has an enlarged diameter relative to the forward roller 50.

An anchor pin 54 is attached to the sidewalls of the tube 22 forward of the yoke 44. A fixed roller 56 is mounted to the sidewalls of the tube 22 forward of the anchor pin 54. The terminal end of the belt 18 is looped around the anchor pin 54 and stitched to itself. The belt 18 extends rearwardly from the anchor pin 54 and around the roller 56, forwardly and around the roller 56, rearwardly around the roller 52 and then forwardly toward its extended position. Thus, the belt 18 is stored in a series of parallel lengths. The spring of the wind-up drum is pretensioned so that the yoke 44 is biased toward its rearward position, however when a nominal pull-out force is applied to the belt 18, the yoke 44 moves toward the anchor pin 54 so that a suitable length of belt can be extended from the stored position.

Thus, it is to be understood that the yoke 44 is movable in positions between the anchor pin 54 and the wind-up drum 34 corresponding to the quantity of belt 18 that is extended from the stored position around the rollers 52, 50 and 56. The belt is fully extended when the yoke 44 is in its forwardmost position with the roller 50 closely adjacent to the anchor pin 54. The maximum quantity of belt is stored when the yoke 44 is in its rearward position adjacent the wind-up drum 34.

Now referring to FIGS. 2 and 3, the locking device 32 preferably comprises a carriage block 58 seated on the lower wall of the tube 22, and forward of the roller 56. The block 58 has an inclined clamping surface 60 adjacent its forward end which extends forwardly toward the upper wall 28 of the tube. A locking bar 62 preferably having a circular cross section is normally arranged at the base of the inclined section 60 at "A" and has a diameter such that in its normal position the belt 18 can move freely from the retracting device 30 toward the roller 24. The locking bar 62 has a diameter such that when moved forwardly toward a belt-clamping position illustrated at "B," it engages the belt 18 and is wedged between the upper wall 28 and the inclined surface 60 of the carriage block 58.

A solenoid 64 is carried by the block 58 and has a rod member 66 supported for movement between forward and rearward positions. The rod 66 is biased by a spring 68 toward the rearward position illustrated in FIGS. 2 and 3.

A plunger 70 having an abutment surface 72 is attached to the forward end of the rod 66. When the solenoid 64 is electrically actuated, the rod 66 and the plunger 70 move forwardly against the bias of the spring 68 and then force the rod 62 from the belt-release position "A" to the belt-clamping position "B."

Referring to FIG. 4, a series of scraper teeth 74 provided on the lower surface of the block 58 are normally seated in an aperture 76 in the lower wall of the tube 22. The scraper teeth 74 have a depth less than the thickness of the wall of the tube 22. When a predetermined tensile force is applied to the belt 18 while the locking bar 62 is in the belt-clamping position "B," the carriage block 58 moves forwardly as a unit with the locking bar 62 with the teeth 74 scraping a series of grooves 78 in the lower wall of the tube 22. Thus, the carriage block 58 can move from a rearward position illustrated in FIG. 2 to a forward position illustrated in phantom at "C" to provide an energy absorbing extension of the belt 18 from its stored position. It can be seen that this extension provides the occupant 12 with a cushioned deceleration when the vehicle experiences a sudden deceleration with the momentum of the occupant being absorbed in the groove scraping work.

Figure 6:
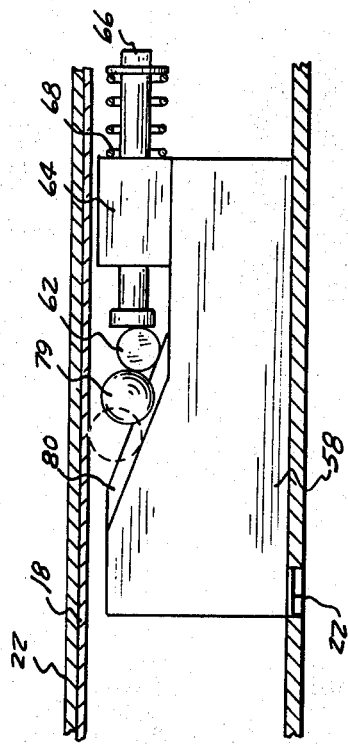
FIG. 6 illustrates an alternative locking device.

FIG. 6 illustrates an alternative form of the locking device 32 wherein the locking bar 62, instead of being the clamping element, engages a plurality of ball elements 79 arranged in a series extending transversely to the movement of the belt 18. Each ball 79 is disposed in an inclined groove 80 extending toward the belt 18. Thus, when the solenoid 64 is actuated, the rod 62 moves the balls 79 upwardly into a wedged engagement with the belt 18. The balls 79 as well as the roller element 62 provide a low-friction clamping engagement between the carriage 58 and the wall 28 of the tube so that the carriage can move forwardly in its energy absorbing displacement while permitting the belt to extend in a controlled manner.

Now referring to FIG. 5, a mercury switch 81 which is preferably, physically disposed in the tube 22 behind the retractor 30 provides a circuit closing connection between the solenoid 64 and the battery 82 carried by the vehicle. The switch 86 preferably comprises a container 84 having a closed hollowed out section 86. A dish-shaped contact member 88 is disposed in the bottom of the hollowed out section 86. The dish-shaped section 88 is preferably formed of a suitable electrical conducting material such as copper or the like and provides a reservoir for a quantity of mercury 90.

A cylindrical section 92 of a suitable electrical conducting material such as copper forms the side of the hollowed out section 86 with its lower edge slightly spaced from the periphery of the dished portion 88. An electrical line 94 connects the dished portion 88 to one terminal of the battery 82 while a line 96 connects the cylindrical section 92 to the solenoid 64. A line 98 connects the opposite terminal of the battery 82 to the solenoid 64.

Thus, the switch 81 is normally in an open position providing an electrical discontinuity between the battery 82 and the solenoid 64. The dish-shaped portion 88 is contoured such that a force acting on the vehicle 16 in any direction and of a predetermined magnitude displaces the mercury 90 to a position as at "D" wherein it bridges the dished portion 88 and the cylindrical portion 92 to provide a closed circuit between the battery 82 and the solenoid 64. The energized solenoid 64 is actuated to force the locking element 62 toward its belt clamping position.

It can also be seen that the container 84 is arranged in a horizontal position and fixed to the vehicle 16 so that mercury 90 is disposed in the bottom of the dished portion 88 in the open circuit position, however, if the vehicle moves to a position inclined with respect its normal horizontal position, the mercury 90 moves toward the closed circuit position thereby actuating the locking device 32 into its belt-clamping position and preventing an uncontrolled extension of the belt section 18.

The instant invention, therefore, provides a seat belt system which includes a seat belt 18 and a retractor means or assembly 30 for extending the seat belt therefrom and for retracting the seat belt. There is also included a clamping means or locking device generally indicated at 32 movable to and from a clamping position as shown in phantom in FIG. 2 for preventing extension of the seat belt 18. The clamping means 32 includes a first surface, as defined by the upper wall of the tube 22, and a second surface, as defined by the inclined upper surface or grooves 80 of the member 58. These surfaces converge toward one another and the belt 18 is disposed between these surfaces. A member comprising the ball 62 is movable along the second surface or upper surface of the member 58 to the clamping position as shown in phantom in FIG. 6 for clamping engagement with the belt 18 as the belt 18 and the member 62 are in wedged engagement between the converging surfaces. Also included is inertia responsive actuator means, including the solenoid, the plunger 66 and the sensing means or mercury switch 81, which is operative upon the member 62 for moving the member 62 in the direction in which the surfaces converge, i.e., the direction in which the member or roller 62 moves from the full line position to the phantom position in FIG. 2. The member or roller 62 is allowed by the solenoid, when the solenoid is deactivated, to move in the opposite direction as a result of forces applied to the roller member 62 by the seat belt; as for example, forces applied to the seat belt by the retractor means 30.

It is to be understood that the switch 81 utilizes a quantity of mercury but it could as well use any suitable electrical conductive, nonwetting fluid.

Although we have described our invention in its simplest terms, it is to be understood that various changes and revisions can be made therein without departing from the spirit of the invention as expressed in the scope of the appended claims.

We claim:

1. A seat belt system comprising; a seat belt, retractor means for extending said seat belt therefrom and for retracting said seat belt, clamping means movable to and from a clamping position in engagement with said seat belt for preventing extension of said belt from the retractor means, said clamping means including a first surface, and a second surface converging toward said first surface, said belt being disposed between said surfaces, a member in rolling engagement with and movable along said second surface to said clamping position for clamping said belt between said first surface and said member as said belt and said member are wedged between said first and second surfaces, and actuator means abutting said member for moving said member in the direction in which said surfaces converge to said clamping position and for allowing said member to freely move in the opposite direction away from said clamping position.

2. A system as set forth in claim 1 including actuator means for moving said member to said clamping position.

3. A system as set forth in claim 2 wherein said member comprises at least one roller.

4. A system as set forth in claim 2 including a support, said second surface being on a stop member, energy absorbing means connecting said stop member to said support to permit movement of said stop member relative to said support upon the application of a predetermined force on said belt thereby to permit controlled extension of said belt while clamped between said first and second surfaces.

5. A system as set forth in claim 4 wherein one of said support and said stop member has a series of scraper teeth engageable with the other in a surface scraping relationship for absorbing energy.

6. A system as set forth in claim 2 wherein said actuator means includes means responsive to a predetermined change in vehicle motion for moving said member to said clamping position.

7. A system as set forth in claim 2 wherein said member is in rolling engagement with said second surface.

8. A system as set forth in claim 7 wherein said member is a roller.

9. A system as set forth in claim 8 including at least one ball disposed between said roller and said first surface.

10. A seat belt system comprising; a seat belt, retractor means for extending said seat belt therefrom and for retracting said seat belt, clamping means movable to and from a clamping position in engagement with said seat belt for preventing extension of said seat belt from said retractor means, said clamping means including a first surface and a second surface converging toward said first surface, said belt being disposed between said surfaces, a member movable along said second surface to said clamping position for clamping engagement with said belt as said belt and said member are in wedged engagement between said first and second surfaces, and inertia responsive actuator means operative upon said member for moving said member in the direction in which said surfaces converge to said clamping position and for allowing said member to move in the opposite direction as a result of forces applied thereto by said belt.

11. A system as set forth in claim 10 including support and energy absorbing means connecting said second surface to said support to permit movement thereof relative to said support upon the application of a predetermined force on said belt thereby to permit controlled extension of said belt while clamped between said first and second surfaces.

12. A system as set forth in claim 10 wherein said actuator means includes sensing means for sensing a change in inertia and link means responsive to said sensing means for moving said member to said clamping position.

13. A system as set forth in claim 10 wherein said member is in rolling engagement with said second surface.

References Cited

UNITED STATES PATENTS

| | | | |
|---|---|---|---|
| 2,655,579 | 10/1953 | Burroughs | 200—61 |
| 3,178,136 | 4/1965 | Bayer | 280—150 |
| 3,371,960 | 3/1968 | Bayer et al. | 280—150 |

BENJAMIN HERSH, Primary Examiner

R. R. SONG, Assistant Examiner

U.S. Cl. X.R.

280—150; 297—389